July 14, 1964 A. B. BROERMAN 3,140,615
PNEUMATIC AMPLIFIER SAMPLING VALVE FOR CHROMATOGRAPHIC ANALYZERS
Filed Oct. 25, 1962 6 Sheets-Sheet 1

INVENTOR.
A.B. BROERMAN
BY
ATTORNEYS

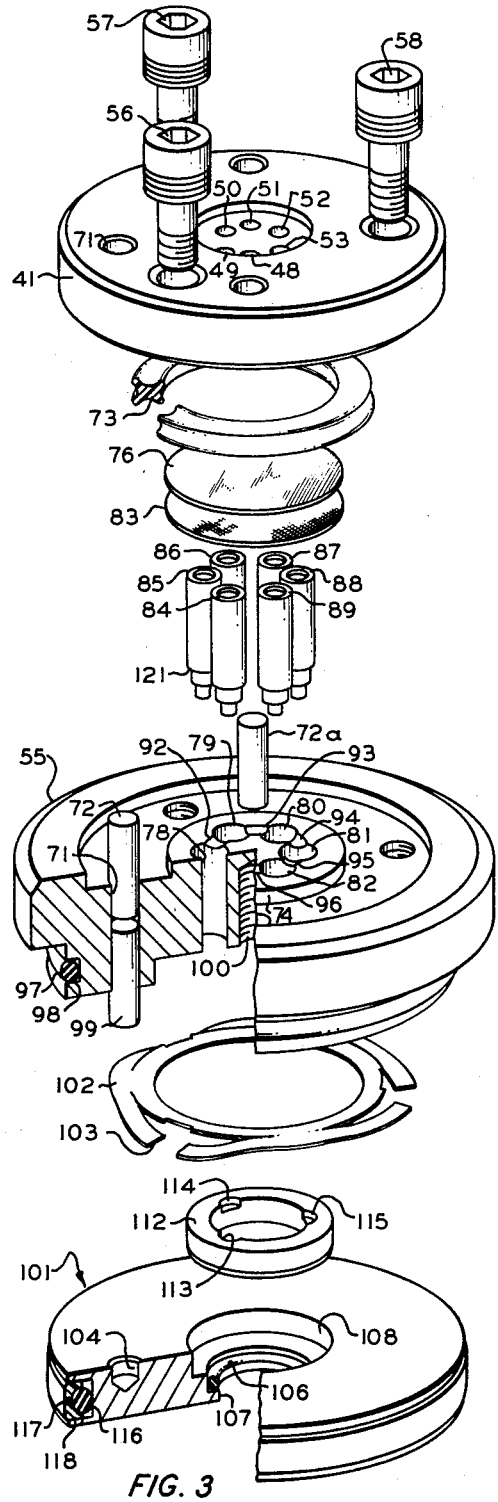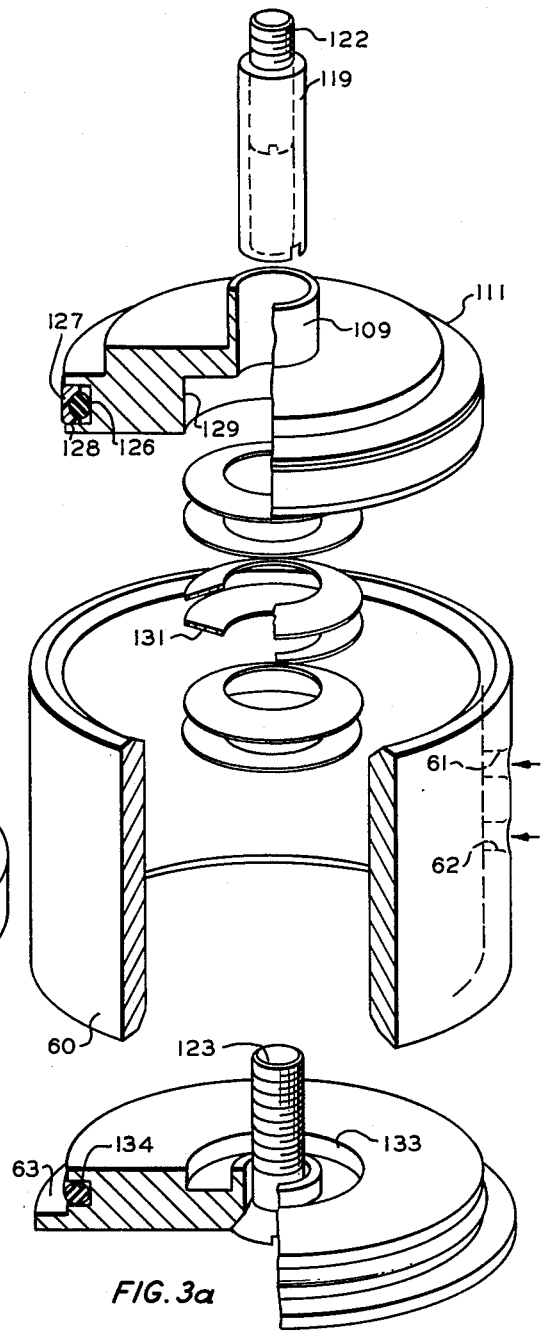
FIG. 3
FIG. 3a
INVENTOR.
A. B. BROERMAN
BY Young & Quigg
ATTORNEYS

INVENTOR.
A.B. BROERMAN
ATTORNEYS

July 14, 1964     A. B. BROERMAN     3,140,615
PNEUMATIC AMPLIFIER SAMPLING VALVE FOR CHROMATOGRAPHIC ANALYZERS
Filed Oct. 25, 1962     6 Sheets-Sheet 4

INVENTOR.
A.B. BROERMAN
BY *Young & Quigg*
ATTORNEYS

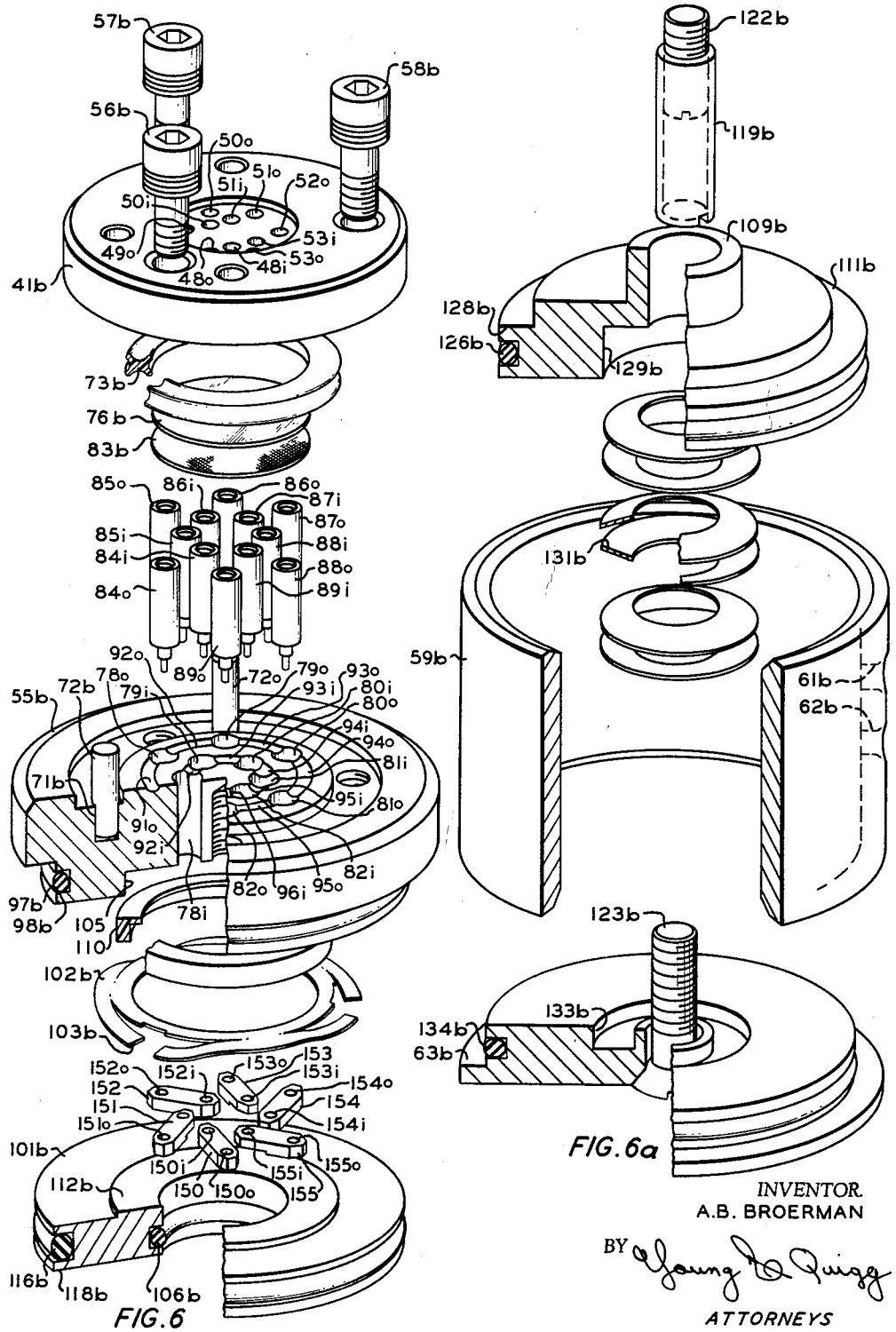

United States Patent Office 3,140,615
Patented July 14, 1964

3,140,615
PNEUMATIC AMPLIFIER SAMPLING VALVE FOR CHROMATOGRAPHIC ANALYZERS
Arthur B. Broerman, Bartlesville, Okla., assignor to Phillips Petroleum Company, a corporation of Delaware
Filed Oct. 25, 1962, Ser. No. 232,933
8 Claims. (Cl. 73—422)

This invention relates to a multi-port, diaphragm-sealed, valve mechanism. In another aspect it relates to a fluid-actuated, multi piston-operated, sampling valve for a chromatographic analyzer having a fluid amplification element for better sealing of the diaphragm.

Gas chromatography is a known method of analyzing fluid samples by preferential sorption and desorption. The desirability of using chromatography for such specific uses as fractionation (multi-stage distillation) control has been recognized for some time. Certain features of process chromatography, such as specific measurement, high sensitivity, and simplicity of operation make this type of analyzer very attractive for use in automatic process control. There are, however, some apparently inherent features of chromatography which have appeared to be obstacles in adapting chromatography to widespread use in process control.

One problem that occurs with the diaphragm-sealing sampling valves used in chromatographic analyzers stems from the use of the plant air-supply as the power fluid to actuate the flexible diaphragm which closes the ports of the sampling valve. Quite often the pressure of the sample stream or the carrier fluid stream approaches or exceeds that of the available plant air, often resulting in poor sealing of the diaphragm, with consequent leaks and bypasses. This, in turn, causes intolerable inaccuracies in analysis, particularly where sample slugs of micro-liter size are being analyzed. The net result in plant applications of gas chromatography has been a serious limitation on the utility of diaphragm-sealed sampling valves.

At the other extreme of operation, it is sometimes desirable to having a diaphragm-sealing sampling valve which is still operable when the flowing pressure of the sample stream and/or the carrier gas is sub-ambient. This will permit the depressed portions of the diaphragm to unseal when power gas, such as plant air, is withdrawn from actuation of the means that mechanically seal the diaphragm at the desired time intervals and location. This seemingly anomalous feature has not been possible heretofore in pneumatically actuated sampling valves.

Present commercial chromatographs have been undesirably limited in the temperature of the process streams which they could sample and analyze with great frequency and dependability. This was because of inherent limitations in the materials of which the flexible diaphragm is composed, in which the sealing means tends to produce "dimples" in the diaphragm, unduly shortening its useful life.

The present invention involves first applying the plant air supply having limited pressure against a power piston of a relatively large area, which diaphragm transmits the pressure to a plurality of cylindrical piston rods of relatively small total area, each rod head provided with a cylindrical recess forming an annular edge, which edge tightly seals the adjacent areas of the sealing diaphragm between the valve ports. In this manner, a significant factor of pneumatic amplification of the plant air pressure is created. For example, the particular embodiment to be described in detail later has an amplification factor of 17 to 1. Thus, a plant air supply of 30 p.s.i. can be effectively increased to a pressure of about 500 p.s.i., exerted by each of the pistons against the sealing diaphragm. This is accomplished by intermittently directing the power fluid to at least one separate chamber enclosed by two power pistons. The side of a first power piston, external of said chamber, contacts a first group of plunger rods. The upper ends of these rods are in close proximity to the flexible sealing diaphragm itself, making sealing contact therewith while their lower ends are contacted by the first power piston. When pneumatic pressure is exerted downwardly on this spring biased, normally raised first piston retracting the same, the positive pressure of the carrier fluid reestablishes flow between adjacent ports, as directed. The side of a second, power-gas loaded power piston, external of said chamber, contacts a second group of plunger rods. The upper ends of the second group are also in close proximity to the sealing diaphragm, making sealing contact therewith when contacted by the second power piston. When power gas is passed to the separate chamber, pressure is being exerted on the second power piston, the flow of carrier gas and/or sample fluid between the adjacent ports is interrupted so long as power gas flows to the separate chamber. This invention overcomes the leaking and bypassing by insuring a strong mechanical seal when particular ports are in the closed position, as desired.

In another embodiment, operation of the sampling valve when the carrier gas and/or sample fluid is flowing at sub-ambient (usually atmospheric) pressures, operation is made possible by the inclusion of a "weephole" connecting to the chamber containing the weak spring, and the "pulling" of a vacuum thereon. The very low pressure in this spring chamber permits the sub-ambient pressure to be sufficient to open the diaphragm seal when the rods are retracted from the underside of the sealing diaphragm.

It is, therefore, an object of this invention to provide a sampling valve for use in a chromatographic analyzer system, whereby leaks and bypassing can be substantially avoided.

It is another object to provide a fluid-actuated, pneumatically amplified diaphragm sealing sampling valve for supplying sample slugs to the columns of a chromatographic analyzer.

It is still another object to provide a sampling valve which employs pneumatic amplification of the power gas pressure to effectively seal a flexible diaphragm actuated valve.

It is yet another object to provide a sampling valve which is operable when the flowing pressure of carrier gas and/or sample fluid are below atmospheric.

It is a still further object to provide a sampling valve operable at sample fluid temperature higher than possible heretofore without sacrifice in the useful life of the diaphragm member.

Other objects, advantages and features of this invention should become apparent from the following detailed description, taken in conjunction with the accompanying drawing in which:

FIGURES 3 and 3a are exploded perspective views of the components of the diaphragm valve of this invention arranged in the order of their assembly;

FIGURES 6 and 6a are exploded perspective views of the components of another embodiment of this invention comprising twelve ports;

Figure 1:
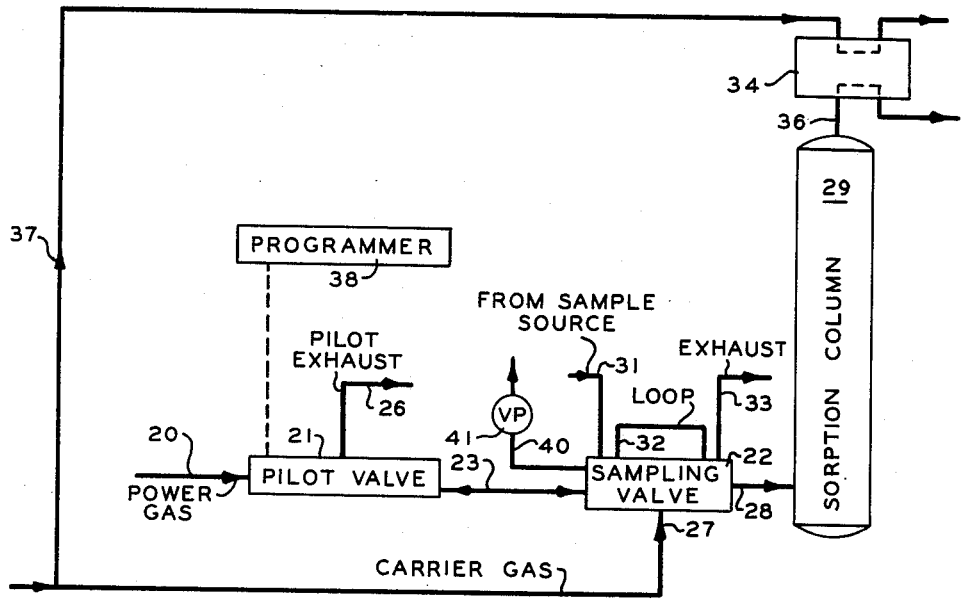
FIGURE 1 is a schematic flow diagram of a chromatographic analyzer system embodying the sampling valve of this invention.

Reference is now made to the drawing in detail, wherein like parts have been designated by like reference numerals, and to FIGURE 1 in particular, wherein a power gas, such as air, passes via conduit 20 to pilot valve 21, wherein the power gas stream is directed to a first chamber (not shown) of a pneumatically-actuated, diaphragm-sealed sampling valve 22 via conduit 23. Alternately, the sampling valve 22 is vented via conduit 23, pilot valve 21, and pilot exhaust conduit 26. A carrier gas, such as helium or hydrogen, is passed via conduit 27, sampling valve 22, and conduit 28 to column 29. A sample source (not shown) such as from process stream, is connected to sampling valve 22 via conduit 31, being circulated through sample loop 32 of sampling valve 22, and vented therefrom via sample exhaust conduit 33. Periodically, the sample in loop 32 is passed along with the carrier gas, via conduit 28, to sorption column 29, where constituents of the sample are absorbed or adsorbed, depending upon the nature of the contact material, and then are selectively desorbed by a continuing flow of carrier gas therethrough to be identified and measured.

The effluent from the sorption column 29 passes through an analyzer, indicated as thermal conductivity assembly 34, via conduit 36. The output signal from the detector 34 is passed to a recording instrument (not shown), which can be a conventional strip chart recorder. A stream of carrier gas is passed via conduit 37 from conduit 27 directly to the reference cell of detector 34, so as to balance out the effect of the carrier gas in the column 29 effluent. The sample gas to be analyzed generally enters the system continuously through conduit 31. It is exhausted through conduit 33, even when a slug thereof is selected for analysis. Pilot valve 21 is actuated by programmer 38, which can be operated by a time cycle or other means. For a detailed discussion of the design and manner of operation of a typical pilot valve which can be used in conjunction with this invention, see the Model 3C1 Air Switch of the Compressed Air Service Company, Dayton 9, Ohio, described in detail in Bulletin 20.

When pilot valve 21 is changed from the first described position, power gas is now exhausted from sampling valve 22 via conduit 23. Carrier gas now passes to sample loop 32, collecting the sample trapped therein, and carrying the same to sorption column 29, via conduit 28. Thus, each time pilot valve 21 is switched to the exhaust position of operation, a measured sample is passed via conduit 28 to column 29 for sorption and desorption therein.

In an alternate embodiment, where carrier gas and/or sample fluid are at subambient pressure, a conduit 40 is connected to another spring chamber (not shown) within the valve. Disposed in conduit 40 is a vacuum pump 41, which is well known in the art, and which is set to "pull" a continuous vacuum on the underside of the sealing diaphragm (not shown).

Figure 2:
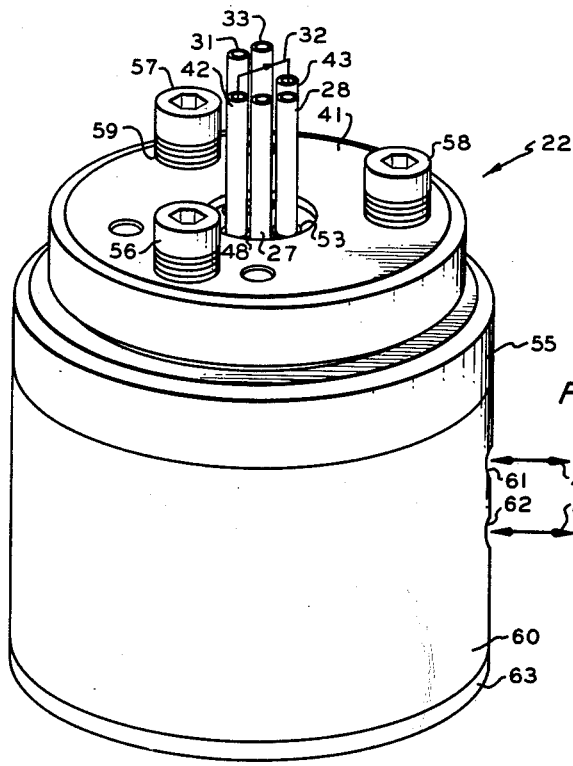
FIGURE 2 is a perspective view of an assembled, fluid-actuated diaphragm-sealed valve of this invention.

In FIGURE 2, there is shown a perspective view of the assembled fluid-actuated flexible diaphragm sampling valve of this invention, generally designated 22. Sampling valve 22 comprises an upper cap 41 provided with six small diameter conduits 27, 28, 31, 33, 42 and 43, which communicate directly with the lower surface of upper block 41 by spaced vertical passages, such as 48. Sample loop 32 communicates between conduits 42 and 43. Conduit 42, for example, is press fitted into spaced passage 48, thereby effecting a seal. Silver brazing gives mechanical strength to the press fit to prevent twisting the conduit and breaking the seal. Adjacent to upper block is intermediate block 55 provided with a plurality of cylindrical passages (not seen) communicating between the upper and lower faces thereof. Allen headed cap screws 56 to 58 secure cap 41 to intermediate block 55, which is spaced therefrom by a flexible sealing diaphragm and cushion (not seen). Plural Belleville washers, such as 59, are positioned on the shaft of the cap screws. Washers 59 permit tightening down cap 41 evenly. This is due to the feel of slowly increasing torque as turning of cap screws 56 to 58 exerts downward pressure on cap 41, gradually compressing the washers flat. There is an abrupt change in the torque as the washers flatten, indicating that further capscrew tightening would damage diaphragm and/or cap. In the prior art method, it is most difficult to tighten the cap without mashing one side of the thin diaphragm, or distorting the cap due to bending.

Disposed adjacent and supporting body 55 is a cylindrical casing or sleeve 60, provided with threaded passages 61 and 62. Passage 61 communicates with an internal spring chamber (not shown) defined by body 55 and an internally disposed first power piston (not seen). Passage 62 communicates with another internal annular chamber (not shown) disposed within casing 60. Disposed adjacent and below casing 60 is a third body 63 serving as a closure plate and forming the base of valve 22.

Referring now to FIGURES 3 and 3a, showing an exploded view of the sampling valve, cap 41 is provided with one or more vertical passages, such as 71 and 71a which accommodate cap key pins, such as 72, that align cap 41 properly relative to body 55. A resilient quad-ring 73, of generally square cross-section, with concave sides, is disposed between cap 41 and body 55. Ring 73 is preferably composed of an elastomeric material which is chemically inert and heat resistant, such as silicone rubber, and seats on shoulder 74 of body 55 beneath cap 41.

A flexible sealing diaphragm 76, of a diameter about that of the inner diameter of raised portion 74, and at least sufficient to cover vertical passages 77 to 82, is disposed above body 55. Sealing diaphragm 76 is preferably composed of a thermosetting plastic which is chemically inert and heat resistant, such as Teflon (a polymer of tetrafluoroethylene).

Disposed between diaphragm 76 and body 55 is a cushion 83, which is suitably a 2 mil thick cloth of Dacron (a polyester fiber). It serves to prevent the Teflon sealing diaphragm from cold flowing, and also furnishes support for it to prevent ballooning under alternating carrier and power gas pressure, which results in an extended cycling life of the valve. Cushion 83 also serves to distribute pressure on the flexible diaphragm against the lower face of cap 41, thus evening out any variations in thickness of the diaphragm.

A set of metal plunger rods 84 to 89, are located within vertical passages 77 to 82, respectively, when the valve is assembled. These rods are machined to have a central relief in their upper end which provides an annular-shaped contact surface, that allows more sealing pressure per unit area to be exerted against the adjacent areas of cushion 83, as directed. Rods 85, 87 and 89 are 0.010 inch shorter than rods 84, 86 and 88.

Recesses 91 to 96, about 0.010–0.014 feet in depth, are provided within the circle described by passages 77 to 82, each recess communicating with the adjacent vertical passages. This type of communication between the vertical passages minimizes hang-up of sample fluid or carrier gas, and obviates excess pressure drop.

A resilient O-ring 97, of generally circular cross-section, is disposed in a peripheral slot 98 in the lower portion of body 55. This ring makes an air-tight seal between body 55 and supporting casing 60. Extending from the lower end of passage 71 is another key pin 99, that aligns body 55 properly relative to air-loaded first power piston 101. A threaded vertical recess 100 is disposed central of body 55 from the lower face.

A crimped, metal retracting spring 102 machined from a spring steel stock is disposed between the lower surface of body 55 and the upper surface of piston 101. The cutouts, such as 103, are aligned to permit the passage of key pins, such as 99, therethrough to anchor in recess 104 of piston 101.

A resilient O-ring seal 106, of generally circular cross-section, is disposed on a shoulder 107 within a passage 108 central of piston 101. As assembled, ring 106, makes sealing contact with collar 109 of spring-loaded, second power piston 111. An annular shaped member 112, serves as a retainer for ring 106, and as a push disc for short plunger rods 85, 87 and 89. Disc 112 is provided with three notched out recesses, 113 to 115, which are adjacent to the lower ends of long plunger rods 84, 86 and 88. These recesses serve as reliefs preventing contact between the rods and disc 112. The lower edge of disc 112 is beveled to aid seating body 101. Another O-ring 116 and a cap seal 117 comprising a thermosetting plastic, such as Teflon, are disposed in a slot 118 in the periphery of piston 101, permitting a sealing contact with the inner wall of casing 60.

An internally threaded cylindrical bushing 119 is provided, having a diameter so that it may pass slidably within collar 109. This upper end of this bushing provides a stop for all the plunger rods in their retracted position, by the contacting of shoulder 121 of rod 84, for example. Assembly screw 122 secures the upper portion of bushing 119 to a threaded recess (not shown) in the lower face of body 55. Another assembly screw 123 secures base 63 to the lower portion of bushing 119, permitting all components between body 55 and base 63 to be compressively tightened together.

An O-ring 126 and cap seal 127 are disposed in a slot 128 in the periphery of piston 111, permitting a sealing contact with the inner wall of casing 60.

A recess 129 is provided in the lower face of piston 111, located central thereof, to accommodate Belleville washers, such as 131, which are grouped in opposing pairs to give the desired amount of upward bias to spring-loaded piston 111, this forces and maintains longer piston rods, like 89, closed, while no power gas pressure is in the annular chamber 132 (see FIGURE 4) defined by pistons 101 and 111. Annular recess 133 in the upper face of base 63 provides a boss for washers 131. A resilient O-ring 134 is disposed in a peripheral slot 136 in base 63, permitting an air-tight seal between casing 60 and base 63.

Figure 4:
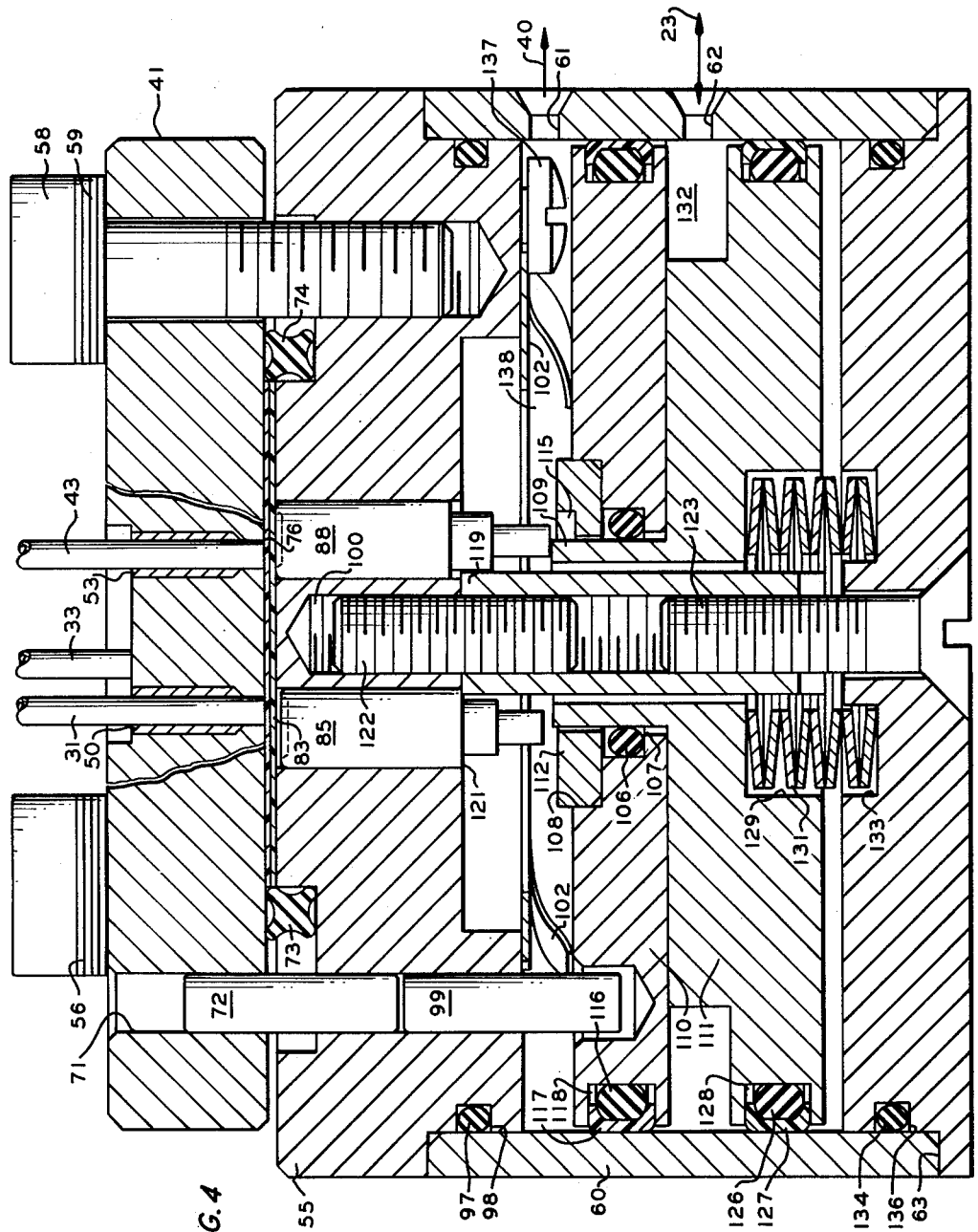
FIGURE 4 is a full sectional view of the assembled valve of this invention.

In FIGURE 4, the assembled valve is shown in full section, except for the assembly screws, pins and plunger rods. A screw 137 is seen which retains retracting spring 102 fastened to the lower surface of body 55. Spring 102 is located in a chamber 138 defined by body 55 and air-loaded piston 111. The vacuum line 40, of the second embodiment, communicates via passage 61 with chamber 138. Chamber 138, in turn, is in communication with the underside of cushion 83 via the working tolerances surrounding the plunger rods, such as 88.

Figure 5:
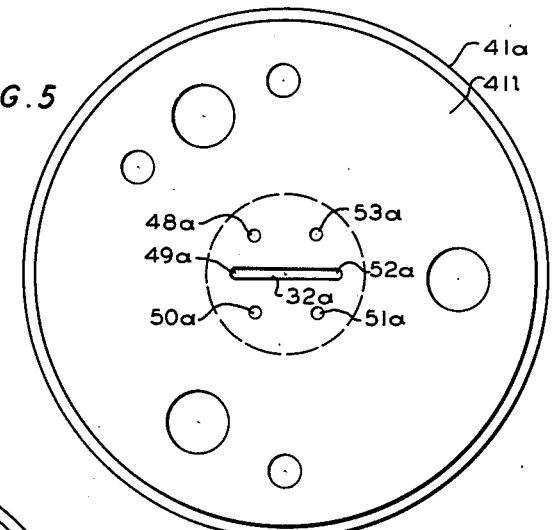
FIGURE 5 is a bottom plan view of the upper member of the valve of an alternate embodiment of the invention.

In FIGURE 5, there is shown a bottom view of an alternate design of upper cap, designated 41a. All the other elements of valve 22 are of identical design and function, with the exception of external sample loop 32, which is replaced by a rectangular groove 32a in face 41L, communicating between recesses 49a and 52a.

Cap 41a has thus been modified to provide sample slugs of microliter size to sorption column 29. Therefore cap 41a requires only four vertical passages 48a, 53a, 51a and 50a, all of which communicate with the lower surface 154 of cap 41a. It is obvious that various dimensions for depth and width of groove 32a can be chosen, as desired, to give a sample loop volume ranging from 0.3 to 100 or more microliters.

In operation, in the absence of power gas flowing to chamber 132, the valve is in the unexcited, "fail safe" condition, preventing intermingling of sample fluid and carrier gas streams. In this at-rest position, depicted in FIGURE 4, spring washers 131 are exerting force on spring-loaded power piston 111, and thru collar portion 109 thereof, holding adjacent long piston rods 84, 86 and 88 in sealing contact with adjacent portions of cushion 83 and sealing diaphragm 76, causing the latter to seal against the lower face of cap 41. Short plunger rods 85, 87 and 89, not being in contact with collar 109, rest on the upper end of bushing 119, the adjacent portions of cushion and diaphragm being relieved, allowing flow between adjacent vertical passages.

Now, carrier gas flowing continuously in conduit 27, under greater than ambient pressure, enters valve 22 via spaced passage 48, passing downwardly to lower face of cap 41, and over toward either spaced passage 49 or 53, depending upon whether piston rod 84 or 89 is in sealing contact with the diaphragm. Since in the unexcited position only longer rod 84 is in sealing contact, carrier gas flows from recess 96 across the top of vertical passage 82, under the diaphragm, over a recess 95 and into spaced passage 53, and out of valve 22, via conduit 28 to sorption column 29. Concurrently, sampling fluid continuously flowing from sample source conduit 31, under greater than ambient pressure, enters valve 22 thru spaced passage 50. Since longer rod 86 is in sealing contact with the diaphragm, sample fluid flows from recess 12 across the top of vertical passage 78 under the diaphragm, over to recess 91 and into passage 49, and out of valve 22, via conduit 42, into sample loop 32. Sample fluid re-enters valve 22 from loop 32 via conduit 43 and passage 52. Since longer rod 88 is in sealing contact with the diaphragm, sample flows from recess 94 across the top of vertical passage 80, under the diaphragm, over to recess 93 and into spaced passage 51, and out of valve 22, via conduit 33 to sample exhaust.

When pilot valve 21 is switched to its alternate position, as determined by programmer 38, now power gas flows thru conduit 23 to sampling valve 22, entering chamber 132 via passage 62. As the power gas pressure builds up in chamber 132, it exerts force on air-loaded power piston 101, first overcoming weak retracting spring 102 and contacting shorter piston rods 85, 87 and 89, raising them to make sealing contact with adjacent portions of cushion 83 and diaphragm 76, causing the latter to seal against the lower face of cap 41, thus shutting off sample and carrier gas flow through valve 22.

Subsequently further pressure build-up in chamber 132 exerts sufficient force on spring-loaded power piston 111 to overcome stronger Belleville washers 131, allowing longer rods 84, 86 and 88 to retract into their vertical passages about .010 inch, by seating on the upper end of bushing 119. The notched recesses, such as 115, must be at least .020 inch deep, .010 inch of which is to allow short rods, such as 85, to rise into sealing poistion on power gas signal, and the other .010 inch of which is to allow long rod, such as 88, to retract sufficiently open to allow flow across the vertical passage between the recesses adjacent the spaced passages.

This sequence is characterized as a "make seal before break seal" mode of operation, which prevents leakage of fluids from one path of flow to the alternate, as the paths of flow are being alternated.

Carrier gas from conduit 27 still enters valve 22 via passage 48, passing downwardly to the lower face of cap 21. Since in this excited position, shorter rod 89 is in sealing contact with diaphragm, carrier gas flows from recess 96 across the top of vertical passage 77, under the diaphragm, over to recess 91 and into spaced passage 49, and thence to sample loop, driving the sample slug trapped therein before it. The carrier gas, with sample fluid entrained, re-enters valve 22 from loop 32 via conduit 43 and spaced passage 52. Since shorter rod 87 is in sealing contact with the diaphragm, sample flows from recess 94 across the top of vertical passage 81, under the diaphragm, over to recess 95 and into spaced passage 53, and out via conduit 28 to sorption column 29 for separation of the constituents in the sample slug in said column.

Simultaneously, sample fluid still enters valve 22 through passage 50. Since shorter rod 85 is in sealing contact with the diaphragm, sample fluid flows from recess 92 across vertical passage 79 over to recess 93 and into spaced passage 51, and out of valve 22, via conduit 33 to sample exhaust.

When pilot valve 21 switches back to the non-excited position, power gas bleeds down thru conduit 23, the power pistons return to their initially described position in reverse sequence and the two sets of piston rods also revert to the poistion shown in FIGURE 4. Thus, the paths of flow of sample and carrier gas will return to that initially described. The frequency with which the sample slug is passed to column 29 is determined by the operation of the pilot valve 21, controlled thru programmer 38.

In operation, the second embodiment of valve 22, shown in FIGURES 2 and 4 by the optional inclusion of a vacuum pump 41, vacuum line 40, and "weep" passage 61 communicating with spring chamber 138, performs identically to that of the first embodiment. The use of sample fluid and/or carrier gas flowing at subambient pressure is made possible by placing the vacuum "pulling" components in operaiton, so long as the chromatograph is on stream and analyzing.

In operation, the third embodiment of valve 22, shown in FIGURE 5, also performs almost identically to that of the first embodiment. The sole difference here is that the sample flows thru internal sample loop 32a instead of thru external loop 32 of FIGURE 2. Thus, when pilot valve switches to the alternate position, a sample slug of much smaller volume passes from valve 22 to column 29.

Referring now to FIGURES 6 and 6a, there is shown an exploded view of a fourth embodiment of the valve of this invention comprising twelve ports and serving as a combined liquid sampling and column switching valve. This embodiment is also operable on a single air signal, and is piped such that with power gas signal on, carrier gas flows through the sample loop to a first and second sorption column, disposed in series, and then to the detector. Concurrently, sample fluid goes directly to vent, and purge gas entry is blocked. With power gas signal off, carrier gas continues to forward flush the second sorption column only, while a purge gas now back flushes the first column and the sample loop. This is known as the fail safe position.

It will first be noted that cap 41b is provided with two sets of spaced passages, 48i to 53i omitting 49i and 52i where there is an external sample loop describing an inner ring, and 48o to 53o describing an outer ring concentric of the first ring.

Quad-ring 73b, sealing diaphragm 76b, and cushion 83b are identical to the corresponding elements in the first embodiment.

Twelve metal plunger rods, all of equal length in this embodiment, are arranged in two concentric circles, 84i to 89i, and 84o to 89o, and are located within vertical passages 71i to 82i, and 77o to 82o, respectively, so as to be adjacent to the circles described by the spaced passages 48 to 53 in cap 41b. All of the rods are machined to have a central relief in their upper end, as in the first embodiment.

Similarly, arc-shaped recesses 91i to 96i are provided within the circle described by vertical passages 77i to 82i and arc-shaped recesses 91o to 96o are provided within the circle described by vertical passages 77o to 82o. All the recesses communicate between the adjacent vertical passages.

Disposed in recess 105 in the lower face of body 55b is a ring 110, having a right angle cross-section, which serves as a lower stop for outer rods 84o to 89o, when they are retracted.

Raised portion 112b of piston 101b is similar in function to member 112 of FIGURE 3, except notches 113 to 115 are omitted.

Disposed within spring 102b and above surface 112b are six straddle blocks, 150 to 155, each block having a vertical passage at each end positioned and sized to accommodate the lower ends of the adjacent piston rods. For example, the lower ends of rods 84i and 89o seat in passages 150i and 150o of block 150, lower ends of rods 85i and 84o seat in passages 151i and 151o of block 151, and so forth. The upper surfaces of blocks 150 to 155 are flat.

Regarding the lower surfaces of the straddle blocks, a different configuration is employed.

Alternate blocks, namely 151, 153 and 155, having one end machined to lower height than the other, with the higher end to the outside, and with a difference in the step of about 0.028 inch. Blocks 150, 152 and 154 are flat on their lower surface as well as upper, with a height intermediate that of the stepped block, or about 0.125 inch. With this configuration, surface 12b of body 101b contacts only the outer stepped up ends of blocks 151, 153 and 155, while collar 109b of body 111b contacts only the center portion of flat blocks 150, 152 and 154.

It will be noted that key 104 of body 101 is omitted from this embodiment, since notches 113 to 115 are not required. All the remaining elements of the valve from screw 122b to base 63b are identical to the first embodiment.

Figure 7:
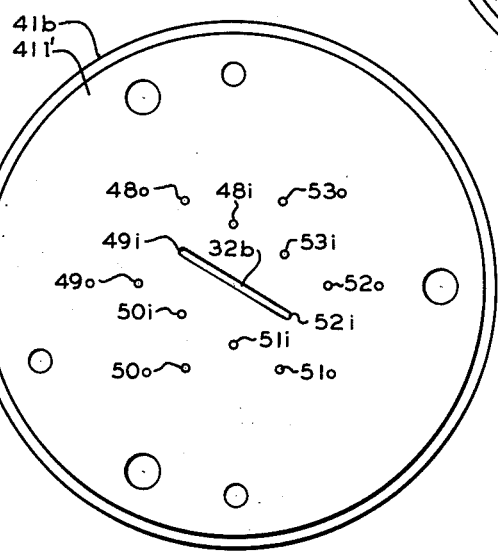
FIGURE 7 is a bottom plan view of the upper member of the valve of another embodiment of this invention.

In FIGURE 7, there is shown a bottom view of the cap 41b of the fourth embodiment shown in FIGURES 6 and 6a. As in the third embodiment of FIGURE 5, groove 32b in lower face 41L communicating between recesses 49i and 52i, serves as a small volume, internal sample loop.

Figure 8:
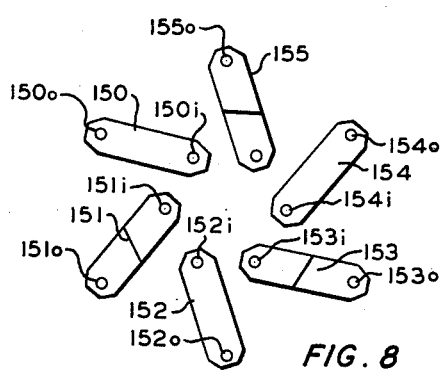
FIGURE 8 is a bottom plan view of the straddle blocks as they appear in normal position.

In FIGURE 8, there is shown a bottom view of the straddle blocks 150 to 156 as they appear when mounted on the lower ends of the piston rods.

Figure 9:
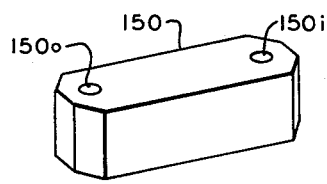
FIGURES 9 and 10 are perspective view of two types of straddle blocks employed in this invention.
Figure 10:
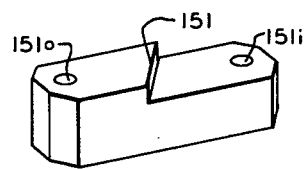

In FIGURES 9 and 10 are shown perspective views of plain and stepped straddle blocks, such as 150 and 151, respectively.

In operation, the twelve-port, internal sample loop, sampling and column switching valve of this invention is employed as follows. While the power gas signal thru passage 62b is off, the valve is in the fail safe position. Spring washers 131b, exerting force on spring-loaded power piston 111b, and thru collar portion 109b thereof, make contact with the lower face of flat straddle blocks 150, 152 and 154, which blocks hold adjacent piston rods 89o, 84i, 85o, 86i, 87o and 88i, in sealing contact with adjacent portions of cushion 83a and sealing diaphragm 76a, causing the latter to seal against the lower face of cap 41b. Stepped straddle blocks 151, 153 and 155, not being in contact with surface 112b of piston 101b are exerting no upward force on the alternate piston rods 84o, 85i, 86o, 87i, 88o and 89i, the latter thus being retracted, and out of contact with the adjacent portions of cushion and diaphragm.

The paths of flow will now be described in relation to FIGURES 11a and 11b. In this fail safe position, carrier gas from conduit 27b enters valve 22b via outer spaced passage 48o, passing downwardly to the lower face of cap 41b, and since piston rod 89o is in sealing contact with the diaphragm, carrier gas flows from recess 96o (cut-out) across the top of vertical passage 77o (cut-out), over to recess 91o, and into spaced passage 49o, and out of valve 22b via conduit 161 to forward flush second sorption column 30b.

Concurrently, sampling fluid from conduit 31b enters valve 22b via inner spaced passage 51i, passing downwardly to the lower cap face and recess 83i, and since piston rod 86i is sealing the diaphragm, sampling fluid flows from recess 92i across the top of vertical passage 80i, over to recess 94i and into terminal 52i of groove 32b.

Sample fluid travels the internal sample loop 32b, over to terminal 49i. Since rod 87i is sealing the diaphragm, sample flows from recess 91i across vertical passage 78i over to recess 92i and into spaced passage 50i, and out of the valve via conduit 33b to sample exhaust.

Concurrently, purge gas, such as helium, enters the valve from conduit 162 via outer spaced passage 51o, passes downwardly to the lower cap face and recess 93o, and since piston rod 86o is retracted, purge gas flows across passage 79o to recess 92o, and into passage 50o, and out of valve 22b via conduit 163 to back flush first sorption column 29b. Purge gas from column 29b re-enters the valve via passage 53i, and since rod 89i is retracted, flows from recess 95i across passage 82i to recess 96i, and into passage 48i, and out of the valve via conduit 164. Purge gas re-enters the valve via spaced passage 53o, and since rod 88o is retracted, flows from recess 95o, across passage 81o to recess 94o, and into passage 52o, and out of valve 22b via conduit 165 to vent.

When the pilot valve is switched to its alternate position, as determined by programmer 38, now power gas flows thru passage 62b to chamber 162b. As power gas pressure builds up, it exerts force on air-loaded power piston 101b, which initially overcomes weak retracting spring 102b, and contacts the higher ends of stepped straddle blocks 151, 153 and 155, which in turn, raise adjacent alternate rods 84o, 85i, 86o, 87i, 88o and 89i, placing them in sealing contact with adjacent portions of cushion 83b and diaphragm 76b. At this moment, all carrier, sample and purge gas flow through the valve is terminated.

Subsequently, further power gas pressure build-up in chamber 132b exerts sufficient force on piston 111b to overcome stronger Belleville washers 131b, retracting the same and dropping the flat straddle blocks, allowing rods 89o, 84i, 85o, 86i, 87o and 88i to retract in their vertical passages to be retained by inner rod stop bushing 119b or outer rod stop ring 110. This sequence is again the aforedescribed "make seal before break seal" mode of operation.

Carrier gas from conduit 27 still enters valve 22b via outer spaced passage 48o passing downwardly to the cap lower face and recess 96o. Since in this excited position, rod 89o is retracted, carrier gas flows across the top of passage 82o, over to recess 95o, and into passage 53o, out via conduit 164 to passage 48i. Since rod 84i is retracted, carrier gas flows from recess 96i across passage 77i to recess 91i and into terminal 49i driving the sample slug trapped therein before it. Carrier gas, with sample fluid entrained flows into terminal 52i, and since rod 88i is retracted, passes from recess 94i across passage 81i to recess 95i and into passage 53i, and out of the valve via conduit 28b, to first column 29b. The effluent in column 163 from column 29b re-enters the valve via outer passage 50o, passes downwardly to recess 42o, and since rod 85o is retracted passes across passage 78o to recess 91o and into passage 49o, and out of the valve via conduit 161 to second column 30b, and thence to detector 34b via 36b.

Concurrently, sample fluid enters the valve from conduit 31b via outer passage 51i, downwardly to recess 93i, and since rod 86i is retracted, passes across passage 79i to recess 92i and into passage 50i, and to vent via conduit 33b.

Concurrently, purge gas still enters the valve via spaced passage 51o, but since rod 86o is in sealing contact with the diaphragm, and communication between 51o and 52o is permanently blocked, then purge gas flow is shut off while the valve is in this position.

When the pilot valve switches back to the fail safe position, power gas bleeds down thru conduit 23, thus the power pistons return to their initially described position, in reverse sequence, and the straddle blocks and adjacent piston rods also revert to the first described position. Thus the paths of flow of sample carrier and purge gas will return to that initially described.

The frequency with which valve 22b is switched is determined by the operation of the pilot valve 21, controlled thru programmer 38.

In order to describe the operation of the system illustrated in FIGURES 11a and 11b, reference will be made to the analysis of a hydrocarbon stream having the following composition:

| Component: | Amount (mol percent) |
| --- | --- |
| Ethane | 3 |
| Propane | 51 |
| Isobutane | 7.8 |
| Normal butane | 21.1 |
| Isopentane | 4.7 |
| Normal pentane | 5.2 |
| Hexanes and heavier | 7 |

Column 29b is 3 feet long and has an inside diameter of less than ¼ inch. This column is packed with 30 weight percent of silicone oil having a viscosity of 200 centistokes and 70 weight percent of 60 to 80 mesh fire brick. Column 30b is of similar construction except that it is 6 feet long. Valve 22b essentially occupies the position illustrated in FIGURE 11b, so that the sample fluid to be analyzed flows through groove 32b which has a volume of 100 microliters. Concurrently, column 29b is purged by helium flowing at a rate of 50 cc. per minute, and column 30b is being forwarded flushed by helium flowing at a rate of 40 cc. per minute. Valve 22b is then switched to the position illustrated in FIGURE 11a, and retained in this position for approximately 100 seconds. At the end of this first time interval, the valve is rotated back to the position illustrated in FIGURE 11b and is retained in this position for approximately 6 minutes and 20 seconds.

Figure 11A:
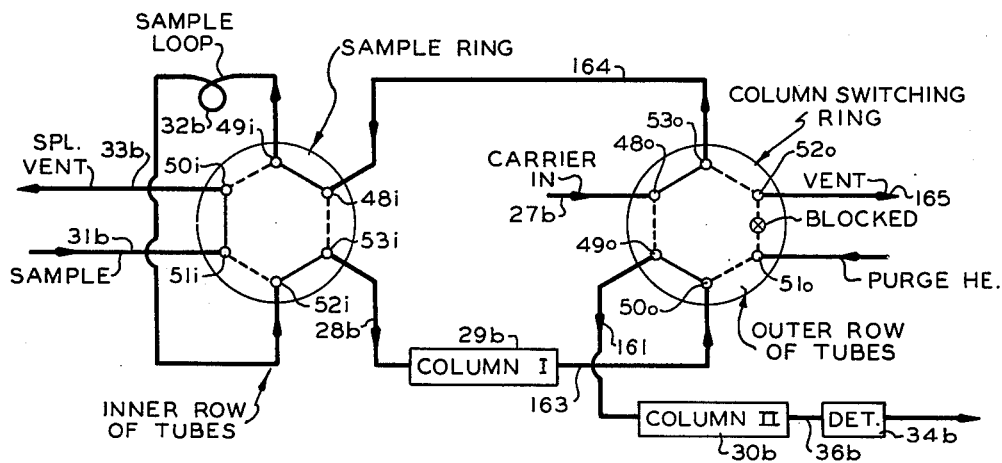
FIGURES 11a and 11b are schematic flow diagrams of a chromatographic analyzer embodying the sampling and column switching valve embodiment of this invention.
Figure 11B:
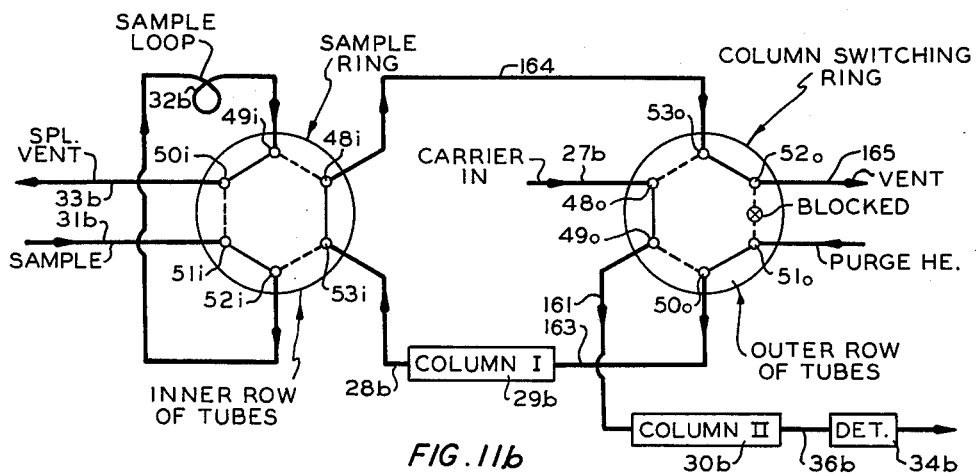

While the valve is in the position illustrated in FIGURE 11a, the sample trapped in groove 32b is forced into column 29b by the carrier gas. The effluent from column 29b passes through column 30b, and then through detector 34b. During the time the valve is in the position illustrated in FIGURE 11a, a partial separation of the hydrocarbon censtituents is made in column 29b with the result that the lighter ethane, propane, and isobutane continue into column 30b and the heavier constituents remain in column 29b. These heavier constituents are purged from column 29b when the valve is switched back to the position illustrated in FIGURE 11b. The lighter constituents are separated in column 30b and passed through detector 34b.

This procedure reduces the time required for a complete analysis cycle by several hours compared to the time required for an analysis if only a single sorption column is employed. This results from the fact that column packing which serves to separate lighter hydrocarbons constituents will hold up the heavier constituents for a considerable period of time.

Reasonable variation and modification are possible within the scope of the foregoing disclosure, the drawings, and the appended claims to the invention.

I claim:

1. A fluid-motor actuated valve system for distributing a first fluid to a selected conduit comprising, in combination: a first body having two opposite faces; first, second, and third spaced passages in said body, each of said spaced passages communicating between said faces; a second body having an upper face spaced from the lower face of said first body; a first flexible sealing diaphragm of a diameter at least sufficient to cover said spaced passages; first, second, and third cylindrical recesses in said upper face, opposite said first, second, and third spaced passages, respectively; first and second cylindrical passages traversing said second body, within the circle described by said cylindrical recesses; first and second plunger rods slidably disposed in said first and second cylindrical passages, respectively; the upper ends of said first and second rods adjacents said diaphragm and intermediate the ports of said first, second, and third spaced passages, so that said first rod seals against said diaphragm intermediate said first and second spaced passages, and so that said second rod seals against said diaphragm intermediate said second and third spaced passages; a first power piston disposed adjacent and below said second body and normally biased out of contact with said second rod; a first chamber defined by the lower face of said second body and the upper face of said first power piston; first biasing means disposed in said first chamber normally biasing said first piston downward; a second power piston disposed adjacent and below said first power piston and normally biased in contact with said first plunger rod; a third body disposed adjacent and below said second piston and normally spaced therefrom; a second chamber defined at its upper end by the lower face of said first power piston and at its lower end by the upper face of said second power piston; a cylindrical casing the inner surface of which makes sealing contact with the peripheries of said power pistons, the upper edge of said casing makes sealing contact with said second body, and the lower edge of said casing makes sealing contact with said third body; a second and stronger biasing means disposed intermediate said second power piston and said third body normally biasing the former upward; means to secure said first, second, and third bodies and said power pistons adjacent to one another in a fixed relationship; a first conduit means connected to supply said first fluid to be distributed under a first pressure to said second spaced passage; a second conduit means connected to receive said first fluid from said first spaced passage; a third conduit means connected to receive said first fluid from said third spaced passage; a fourth conduit means connected to supply, during a first time interval, a second fluid under a second pressure greater than said first pressure to said second chamber to exert upward pressure on said first power piston, first overcoming said first biasing means and exerting force on said second plunger rod, contacting the upper side of said first power piston to force a first portion of said sealing diaphragm adjacent thereto to seal between the ports of said third and second spaced passages of said first body; said second fluid simultaneously exerting increasing downward pressure on said second power piston, overcoming said second biasing means, thus retracting said second piston means, permitting said first plunger rod to break sealing contact with a second portion of said sealing diaphragm adjacent thereto, thereby establishing communication between the ports of said first and second spaced passages; whereby first fluid enters said valve system through said second passage and passes out of said system through said first passage; said fourth conduit means adapted to vent said second chamber, during a second time interval, whereupon said power pistons revert to their first described position, during which said first fluid pressure will establish communication between said third and second spaced passages under said diaphragm, while maintaining sealing communication between said first and second spaced passages, whereby said first fluid enters said system through said second spaced passage and passes out of said system through said third passage.

2. The valve system of claim 1 wherein said means to secure said bodies to one another comprises, in part, a plurality of cap screws, the shafts of which traverse said first body and are threadedly secured in said second body, and a plurality of Belleville washer disposed on said shafts above said first body, where even tightening of said bodies to one another is attained.

3. A fluid-motor actuated valve system for distributing a first fluid to a selected conduit comprising, in combination: a first body having two opposite faces; first, second, and third spaced passages in said body, each of said spaced passages communicating between said faces; a second body having an upper face spaced from the lower face of said first body; a first flexible sealing diaphragm of a diameter at least sufficient to cover said spaced passages; first, second, and third cylindrical recesses in said upper face, opposite said first, second, and third spaced passages, respectively; first and second cylindrical passages traversing said second body, within the circle described by said cylindrical recesses; first and second plunger rods slidably disposed in said first and second cylindrical passages, respectively; the upper ends of said first and second rods adjacent said diaphragm and intermediate the ports of said first, second and third spaced passages, so that said first rod seals against said diaphragm intermediate said first and second passages and so that said second rod seals against said diaphragm intermediate said second and third spaced passages; a first power piston disposed adjacent and below said body and normally biased out of contact with said second rod; a first chamber defined by the lower face of said second body and the upper face of said first power piston; a first biasing means disposed in said first chamber normally biasing said first piston downward; a second power piston disposed adjacent and below said first power piston and normally biased in contact with said first plunger rod; a third body disposed adjacent and below said second piston and normally spaced therefrom; a second chamber defined at its upper end by the lower face of said first power piston and at its lower end by the upper face of said second power piston; a cylindrical casing the inner surface of which makes sealing contact with the peripheries of said power pistons, the upper edge of said casing makes sealing contact with said second body, and the lower edge of said casing makes sealing contact with said third body; a second and stronger biasing means disposed intermediate said second power piston and said third body normally biasing the former upward; an access passage in said casing communicating with said first chamber; means communicating with said access passage adapted to reduce and maintain the pressure in said first chamber substantially below ambient, whereby said valve system is operative when said first pressure of said first fluid is below ambient pressure; means to secure said first, second and third bodies and said power pistons adjacent to one another in a fixed relationship; a first conduit means connected to supply said first fluid to be distributed under a first pressure to said second spaced passage; a second conduit means connected to receive said first fluid from said first spaced passage; a third conduit means connected to receive said first fluid from said third spaced passage; a fourth conduit means connected to supply, during a first time interval, a second fluid under a second pressure greater than said first pressure to said second chamber to exert upward pressure on said first power piston, first overcoming said first biasing means and exerting force on said second plunger rod, contacting the upper side of said first power piston to force a first portion of said sealing diaphragm adjacent thereto to seal between the ports of said third and second spaced passages of said first body; said second fluid simultaneously exerting increasing downward pressure on said second power piston, overcoming said second biasing means, thus retracting said second piston means, permitting said first plunger rod to break sealing contact with a second portion of said sealing diaphragm adjacent thereto, thereby establishing communication between the ports of said first and second spaced passages; whereby first fluid enters said valve system through said second passage and passes out of said system through said first passage; said fourth conduit means adapted to vent said second chamber, during a second time interval, whereupon said power pistons revert to their first described position, during which said first fluid pressure will establish communication between said third and second spaced passages under said diaphragm, while maintaining sealing communication between said first and second spaced passages, whereby said first fluid enters said system through said second spaced passage and passes out of said system through said third passage.

4. A two-position, fluid actuated, diaphragm-sealed sample valve, comprising, in combination: a first body having two opposite faces; first, second, third, and fourth spaced passages in said body, each of said spaced passages communicating between said faces; a second body having an upper face spaced from the lower face of said first body; a first flexible sealing diaphragm of a diameter at least sufficient to cover said spaced passages; a groove disposed in the lower face of said first body having a length equal to the diameter of the circle described by said spaced passages; first, second, third, fourth, fifth, and sixth recesses in said upper face disposed so that one end of said first groove is opposite said first recess, said first spaced passage is opposite said second recess, said second spaced passage is opposite said third recess, the other end of said first groove is opposite said fourth recess, said third spaced passage is opposite said fifth recess, said fourth spaced passage is opposite said sixth recess; first, second, third, fourth, fifth, and sixth cylindrical passages traversing said second body on the circle described by said recesses; first, second, third, fourth, fifth, and sixth plunger rods disposed in said first through sixth cylindrical passages, respectively; the upper ends of said first through sixth rods adjacent said diaphragm and intermediate the ports of said first through fourth spaced passages and said ends of said first groove, so that said first rod seals against said diaphragm intermediate said one end of said first groove and the port of said first spaced passage, said second rod seals against said diaphragm intermediate the ports of said first and second spaced passage, said third rod seals against said diaphragm intermediate the port of said second spaced passage and said other end of said first groove, said fourth rod seals against said diaphragm intermediate said other end and the port of said third spaced passage, said fifth rod seals against said diaphragm intermediate the ports of said third and fourth spaced passages, and said sixth rod seals against said diaphragm intermediate the port of said fourth spaced passage and said one end of said first groove; a first power piston disposed adjacent and below said second body and normally biased out of contact with said first, third, and fifth rods; a first chamber defined by the lower face of said second body and the upper face of said first power piston; first biasing means disposed in said first chamber normally biasing said first piston downwardly; a second power piston disposed adjacent and below said first power piston and normally biased in contact with said second, fourth and sixth plunger rods; a third body disposed adjacent and below said second piston and normally spaced therefrom; a second chamber defined at its upper end by the lower face of said first power piston and at its lower end by the upper face of said second power piston; a cylindrical casing, the inner surface of which makes sealing contact with the peripheries of said power pistons, the upper edge of said casing making sealing contact with said second body and the lower edge of said casing making sealing contact with said third body; a second and stronger biasing means disposed intermediate said second power piston and said third body normally biasing the former upwardly; means to secure said first, second, and third bodies and said power pistons adjacent to one another in a fixed relationship; the first of said fourth spaced passages adapted to receive a flowing carrier gas; the second of said spaced passages adapted to receive a flowing sample fluid; the third of said spaced passages adapted to vent said sample fluid; and the fourth of said spaced passages for conducting carrier gas and the sample fluid, as desired, from said sampling valve; said second chamber adapted to receive a second fluid which exerts upward pressure on said first power piston, first overcoming said first biasing means and exerting force on said first, third, and fifth plunger rods, contacting the upper side of said first piston means, to force a first, third, and fifth portions of said sealing diaphram adjacent thereto to seal between alternate pairs of ports of said spaced passages and terminals of said first groove; said second fluid simultaneously exerting increasing downward pressure on said second power piston, overcoming said second biasing means, thus retracting said second piston means, permitting said second, fourth, and sixth plunger rods to break sealing contact with a second, fourth, and sixth portion of said sealing diaphragm adjacent thereto, thereby establishing communication between the other alternate pairs of ports of said spaced passages and terminals of said first groove; whereby carrier gas enters said valve through said first spaced passage, passes through said groove, driving before it a slug of sample fluid trapped therein; out of said valve via said fourth spaced passage while said sample fluid enters said second spaced passage and directly exits said third spaced passage; said second chamber adapted to be vented, during a second time interval, whereupon said power pistons revert to their first described position, during which carrier gas enters said valve through said first spaced passage and directly exits through said fourth spaced passage, while sample fluid enters said valve through said second spaced passage, passes through said groove, and is vented through said third spaced passage.

5. A two-position, fluid actuated, diaphragm-sealed sample valve, comprising, in combination: a first body having two opposite faces; first, second, third and fourth spaced passages in said body, each of said spaced passages communicating between said faces; a second body having an upper face spaced from the lower face of said first body; a first flexible sealing diaphragm of a diameter at least sufficient to cover said spaced passages; a first groove disposed in the lower face of said first body having a length equal to the diameter of the circle described by said spaced passages; first, second, third, fourth, fifth and sixth cylindrical recesses in said upper face disposed so that one end of said first groove is opposite said first cylindrical recess, said first spaced passage is opposite said second cylindrical recess, said second spaced passage is opposite said third cylindrical recess, the end of said first groove is opposite said fourth cylindrical recess, said third spaced passage is opposite said fifth cylindrical recess, said fourth spaced passage is opposite said sixth cylindrical recess; first, second, third, fourth, fifth and sixth cylindrical passages traversing said second body within the circle described by said cylindrical recesses; first, second, third, fourth, fifth and sixth plunger rods disposed in said first through sixth cylindrical passages, respectively; the upper ends of said first through sixth rods adjacent said diaphragm and intermediate the ports of said first through fourth spaced passages and said ends of said first groove, so that said first rod seals against said diaphragm intermediate said one end of said first groove and the port of said first spaced passage, said second rod seals against said diaphragm intermediate the ports of said first and second spaced passage, said third rod seals against said diaphragm intermediate the port of said second spaced passage and said other end of said first groove, said fourth rod seals against said diaphragm intermediate said other end and the port of said third spaced passage, said fifth rod seals against said diaphragm intermediate the ports of said third and fourth spaced passages, and said sixth rod seals against said diaphragm intermediate the port of said fourth spaced passage and said one end of said first groove; a first power piston disposed adjacent and below said second body and normally biased out of contact with said first, third, and fifth rods; a first chamber defined by the lower face of said second body and the upper face of said first power piston; a first biasing means disposed in said first chamber normally biasing said first piston downwardly; a second power piston disposed adjacent and below said first power piston and normally biased in contact with said second, fourth, and sixth plunger rods; a third body disposed adjacent and below said second piston and normally spaced therefrom; a second chamber defined at its upper end by the lower face of said first power piston and at its lower end by the upper face of said second power piston; a cylindrical casing, the inner surface of which makes sealing contact with the peripheries of said power pistons, the upper edge of said casing making sealing contact with said second body and the lower edge of said casing making sealing contact with said third body; a second and stronger biasing means disposed intermediate said second power piston and said third body normally biasing the former upwardly; an access passage in said casing communicating with said first chamber; means communicating with said access passage adapted to reduce and maintain the pressure in said first chamber substantially below sample and carrier fluid pressure, whereby said valve system is operative when said first pressure of said first fluid is below ambient pressure; means to secure said first, second and third bodies and said power pistons adjacent to one another in a fixed relationship; the first of said fourth spaced passages adapted to receive a flowing carrier gas; the second of said spaced passages adapted to receive a flowing sample fluid; the third of said spaced passages adapted to vent said sample fluid; and the fourth of said spaced passages for conducting carrier gas and the sample fluid, as desired, from said sampling valve; said second chamber adapted to receive a second fluid which exerts upward pressure on said first power piston, first overcoming said first biasing means and exerting force on said second, fourth and sixth plunger rods, contacting the upper side of said first piston means, to force a first, third, and fifth portions of said sealing diaphragm adjacent thereto to seal between the alternate pairs of ports of said spaced passages and ends of said first groove; said second fluid simultaneously exerting increasing downward pressure on said second power piston, overcoming said second biasing means, thus retracting said second piston means, permitting said second, fourth, and sixth plunger rods to break sealing contact with a second, fourth, and sixth portions of said sealing diaphragm adjacent thereto, thereby establishing communication between the other alternate pairs of ports of said spaced passages and ends of said first groove; whereby carrier gas enters said valve through said first spaced passage, passing through said groove, driving before it a slug of sample fluid trapped therein, out of said valve, via said fourth spaced passage while said sample fluid enters said second spaced passage and directly exits said third spaced passage; said second chamber adapted to be vented, during a second time interval, whereupon said power pistons revert to their first described position, during which carrier gas enters said valve through said first spaced passage and directly exits through said fourth spaced passage, while sample fluid enters said valve through said second spaced passage, passes through said first groove, and is vented through said fourth spaced passage.

6. A two-position, fluid actuated, diaphragm-sealed, valve sampling system comprising, in combination: a first body having two opposite faces; first, second, third, fourth, fifth and sixth spaced passages in said body, each of said spaced passages communicating between said faces, a second body having an upper face spaced from the lower face of said first body; a first flexible sealing diaphragm of a diameter at least sufficient to cover said spaced passages; first, second, third, fourth, fifth and sixth cylindrical recesses in said upper face, opposite said first through sixth spaced passages respectively; first, second, third, fourth, fifth and sixth cylindrical passages traversing said second body within the circle described by said cylindrical recesses; first, second, third, fourth, fifth and sixth plunger rods slidably disposed in said first through sixth cylindrical passages, respectively; the upper ends of said rods adjacent said diaphragm and intermediate the ports of said first through sixth spaced passages, so that said first rod seals against said diaphragm intermediate the ports of said first and second spaced passages, so that said second rod seals against said diaphragm intermediate the ports of said second and third spaced passages, so that said third rod seals against said diaphragm intermediate said third and fourth spaced passages, so that said fourth rod seals against said diaphragm intermediate said fourth and fifth spaced passages, so that said fifth rod seals against said diaphragm intermediate said fifth and sixth spaced passages, and so that said sixth rod seals against said diaphragm intermediate said sixth and first spaced passages; a first power piston disposed adjacent and below said second body and normally biased out of contact with said first, third, and fifth rods; a first chamber defined by the lower face of said second body and the upper face of said first power piston; first biasing means disposed in said first chamber normally biasing said first piston downwardly; second power piston disposed adjacent and below said first power piston and normally biased in contact with said second, fourth and sixth plunger rods; a third body disposed adjacent and below said second piston and normally spaced therefrom; a second chamber defined at its upper end by the lower face of said first power piston and at its lower end by the upper face of said second power piston; a cylindrical casing, the inner surface of which makes sealing contact with the peripheries with said power pistons, the upper edge of said casing making sealing contact with said second body and the lower edge of said casing making sealing contact with said third body; a second and stronger biasing means disposed intermediate said second power piston and said third body normally biasing the former upwardly; means to secure said first, second and third bodies and said power pistons adjacent to one another in a fixed relationship; a carrier gas supply; a first conduit means for conducting carrier gas to said first spaced passages; a sample source; a second conduit means for conducting fluid sample to said second spaced passages; an external sample loop communicating between the third and fourth of said spaced passages; a third conduit means for venting said vaporized sample gas from the fifth of said spaced passages, and a fourth conduit means for conducting said carrier gas and said vaporized sample from the sixth of said spaced passages to a sorption column; a power gas source; fifth conduit means for conducting power gas therefrom to said second chamber to exert pressure on said power pistons during a first time interval; said power gas first overcoming said first biasing means and exerting force on said first, third and fifth plunger rods, contacting the upper side of said first power piston, to force first, third and fifth portion of said sealing diaphragm adjacent thereto to seal between alternate pairs of ports of said spaced passages of said first body; said power gas simultaneously exerting increasing downward pressure on said second power piston, overcoming said second biasing means, thus retracting said second piston means, permitting said second, fourth and sixth plunger rods to break sealing contact with second, fourth and sixth portions of said sealing diaphragm adjacent thereto, thereby establishing communication between the other alternate pairs of ports of said spaced passages, whereby carrier gas enters said valve through said first spaced passage, passes through said sample loop, driving before it a slug of sample fluid trapped therein, and out of said valve via said fourth spaced passage, while sample fluid enters said valve via said second spaced passage and directly exits via said third spaced passage; said first conduit means adapted to vent said second chamber, during a second time interval, whereupon said power pistons revert to their first described position, during which carrier gas will establish communication between the first alternate ports, while maintaining sealing communication between the other set of alternate ports, whereby carrier gas enters said system through said first spaced passage and directly exits said fourth spaced passage, while said sample fluid enters said second spaced passage, passes through said sample loop, and exits via said third spaced passage.

7. A two-position, fluid actuated, diaphragm-sealed, valve sampling system comprising, in combination: a first body having two opposite faces; first, second, third, fourth, fifth and sixth spaced passages in said body, each of said spaced passages communicating between said faces, a second body having an upper face spaced from the lower face of said first body; a first flexible sealing diaphragm of a diameter at least sufficient to cover said spaced passages; first, second, third, fourth, fifth and sixth cylindrical recesses in said upper face, opposite said first through sixth spaced passages respectively; first, second, third, fourth, fifth and sixth cylindrical passages traversing said second body within the circle described by said cylindrical recesses; first, second, third, fourth, fifth and sixth plunger rods slidably disposed in said first through sixth cylindrical passages, respectively; the upper ends of said rods adjacent said diaphragm and intermediate the ports of said first through sixth spaced passages, so that said first rod seals against said diaphragm intermediate the ports of said first and second spaced passages, so that said second rod seals against said diaphragm intermediate the ports of said second and third spaced passages, so that said third rod seals against said diaphragm intermediate said third and fourth spaced passages, so that said fourth rod seals against said diaphragm intermediate said fourth and fifth spaced passages, so that said fifth rod seals against said diaphragm intermediate said fifth and sixth spaced passages, and so that said sixth rod seals against said diaphragm intermediate said sixth and first spaced passages; a first power piston disposed adjacent and below said second body and normally biased out of contact with said first, third and fifth rods; a first chamber defined by the lower face of said second body and the upper face of said first power piston; first biasing means disposed in said first chamber normally biasing said first piston downwardly; second power piston disposed adjacent and below said first power piston and normally biased in contact with said second, fourth and sixth plunger rods; a third body disposed adjacent and below said second piston and normally spaced therefrom; a second chamber defined at its upper end by the lower face of said first power piston and at its lower end by the upper face of said second power piston; a cylindrical casing, the inner surface of which makes sealing contact with the peripheries with said power pistons, the upper edge of said casing making sealing contact with said second body and the lower edge of said casing making sealing contact with said third body; a second and stronger biasing means disposed intermediate said second power piston and said third body normally biasing the former upwardly; an access passage in said casing communicating with said first chamber; means communicating with said access passage adapted to reduce and maintain the pressure in said first chamber substantially below ambient, whereby said valve system is operative when said first pressure of said first fluid is below ambient pressure; means to secure said first, second and third bodies and said power pistons adjacent to one another in a fixed relationship; a carrier gas supply; a first conduit means for conducting carrier gas to said first spaced passages; a sample source; a second conduit means for conducting fluid sample to said second spaced passages; an external sample loop communicating between the third and fourth of said spaced passages; a third conduit means for venting said vaporized sample gas from the fifth of said spaced passages, and a fourth conduit means for conducting said carrier gas and said vaporized sample from the sixth of said spaced passages to a sorption column; a power gas sources; fifth conduit means for conducting power gas therefrom to said second chamber to exert pressure on said power pistons during a first time interval; said power gas first overcoming said first biasing means and exerting force on said first, third and fifth plunger rods, contacting the upper side of said first power piston, to force first, third and fifth portion of said sealing diaphragm adjacent thereto to seal between alternate pairs of ports of said spaced passages of said first body; said power gas simultaneously exerting increasing downward pressure on said second power piston, overcoming said second biasing means, thus retracting said second piston means, permitting said second, fourth and sixth plunger rods to break sealing contact with second, fourth and sixth portions of said sealing diaphragm adjacent thereto, thereby establishing communication between the other alternate pairs of ports of said spaced passages, whereby carrier gas enters said valve through said first spaced passage, passes through said sample loop, driving before it a slug of sample fluid trapped therein, and out of said valve via said fourth spaced passage, while sample fluid enters said valve via said second spaced passage and directly exits via said third spaced passage; said first conduit means adapted to vent said second chamber, during a second time interval, whereupon said power pistons revert to their first described position, during which carrier gas will establish communication between the first alternate ports, while maintaining sealing communication between the other set of alternate ports, whereby carrier gas enters said system through said first spaced passage and directly exits said fourth spaced passage, while said sample fluid enters said second spaced passage, passes through said sample loop, and exits via said third spaced passage.

8. A two-position, fluid actuated, diaphragm-sealed sampling and column switching valve system comprising, in combination: a first body having two opposite faces; first, second, third and fourth spaced passages in said first body describing a first circle, fifth, sixth, seventh, eighth, ninth and tenth spaced passages in said first body describing a second circle concentric of said first circle; all of said passages communicating between said faces; a second body having an upper face spaced from the lower face of said first body; a first flexible sealing diaphragm of a diameter at least sufficient to cover the lower ends of said spaced passages; a groove disposed in said lower face having a length equal to the diameter of said first circle; first, second, third, fourth, fifth, and sixth recesses in said upper face disposed so that one end of said first groove is opposite said first recess, said first spaced passage is opposite said second recess, said second spaced passage is opposite said third recess, the other end of said first groove is opposite said fourth recess, said third spaced passage is opposite said fifth recess, said fourth spaced passage is opposite said sixth recess; seventh, eighth, ninth, tenth, eleventh, and twelfth recesses in said upper face describing a fourth circle concentric of said third circle, and disposed so that said fifth spaced passage is opposite said twelfth recess, said sixth spaced passage is opposite said seventh recess, said seventh spaced passage is opposite said eighth recess, said eighth spaced passage is opposite said ninth recess, said ninth spaced passage is opposite said tenth recess, and said tenth spaced passage is opposite said eleventh recess; first, second, third, fourth, fifth and sixth cylindrical passages traversing said second body within the third circle described by the inner recesses; first, second, third, fourth, fifth and sixth plunger rods disposed in said first through sixth cylindrical passages, respectively; the upper ends of said first through sixth rods adjacent said diaphragm and intermediate the ports of said first through fourth spaced passages and said ends of said first groove, so that said first rod seals against said diaphragm intermediate said one end of said first groove and the port of said first spaced passage, said second rod seals against said diaphragm intermediate the ports of said first and second spaced passage, said third rod seals against said diaphragm intermediate the port of said second spaced passage and said other end of said first groove, said fourth rod seals against said diaphragm intermediate said other end and the port of said third spaced passage, said fifth rod seals against said diaphragm intermediate the ports of said third and fourth spaced passages, and said sixth rod seals against said diaphragm intermediate the port of said fourth spaced passage and said one end of said first groove; seventh, eighth, ninth, tenth, eleventh and twelfth cylindrical passages traversing said second body on the fourth circle described by the outer recesses; seventh, eighth, ninth, tenth, eleventh and twelfth plunger rods disposed in said seventh through twelfth cylindrical passages, respectively; the upper ends of said seventh through twelfth rods adjacent said diaphragm and intermediate the ports of said fifth through sixth spaced passages, so that said seventh rod seals against said diaphragm intermediate the ports of said fifth and sixth spaced passages, said eighth rod seals against said diaphragm intermediate the ports of said sixth and seventh spaced passages, said ninth rod seals intermediate the ports of said seventh and eighth spaced passages; said tenth rod seals intermediate the ports of said eighth and ninth spaced passages, said eleventh rod seals intermediate the ports of said ninth and tenth spaced passages, and said twelfth rod seals intermediate the ports of said tenth and first spaced passage; first, second, third, fourth, fifth, and sixth straddle blocks disposed below said second body; each of said blocks provided with a passage at each end positioned and sized to accommodate the lower ends of said plunger rods, so that said sixth and twelfth rods seat in said first block, said first and seventh rods seat in said second block; said second and eighth rods seat in said third block; said third and ninth rods seat in said fourth block; said fourth and tenth rods seat in said fifth block, said fifth and eleventh rods seat in said sixth block; the first, third and fifth of said blocks being flat on both upper and lower surfaces; the second, fourth and sixth of said blocks being flat on their upper surface and stepped on their lower surface, with higher end of the stepped blocks to the outer circle of plunger rods; a first power piston disposed adjacent and below said second body and normally biased out of contact with said higher ends of said stepped straddle blocks; a first chamber defined by the lower face of said second body and the upper face of said first power piston; first biasing means disposed in said first chamber normally biasing said first piston downwardly; a second power piston disposed adjacent and below said first power piston and normally biased in contact with the inner ends of said flat straddle blocks; a third body disposed adjacent and below said second piston and normally spaced therefrom; a second chamber defined at its upper end by the lower face of said first power piston and at its lower end by the upper face of said second power piston; a cylindrical casing, the inner surface of which makes sealing contact with the peripheries of said power pistons, the upper edge of said casing making sealing contact with said second body and the lower edge of said casing making sealing contact with said third body; a second and stronger biasing means disposed intermediate said second power piston and said third body normally biasing the former upwardly; means to secure said first, second, and third bodies and said power pistons adjacent to one another in a fixed relationship; the first of said spaced passages adapted to secure a flowing sample fluid; the second of said spaced passages communicating with one end of a first sorption column; the third of said spaced passages communicating with the tenth of said spaced passages; the fourth of said spaced passages adapted to vent said sample fluid; the fifth of said spaced passages adapted to receive a flowing carrier gas; the sixth of said spaced passages communicating with a second sorption column; the seventh of said spaced passages communicating with the other end of said first column; the eighth of said spaced passages adapted to receive a flowing purge gas; and the ninth of said spaced passages adapted to vent said purge gas; said second chamber adapted to receive a second fluid which exerts upward pressure on said first power piston, initially overcoming said first biasing means and exerting force on said first, third and fifth straddle blocks contacting the upper side of said first piston means, and on the rods seated therein for force a first, second, third, fourth, fifth and sixth portions of said sealing diaphragm adjacent thereto to seal alternate pairs of ports of said first through fourth spaced passages and terminals of said groove, and also seal between alternate pairs of ports of said fifth through tenth spaced passages; said second fluid simultaneously exerting increasing downward pressure on said second power piston, overcoming said second biasing means, thus retracting said second piston means, permitting said second, fourth and sixth of said straddle blocks, and the plunger rods seated thereon to break sealing contact with a seventh, eighth, ninth, tenth, eleventh and twelfth portions of said sealing diaphragm adjacent thereto, thereby establishing communication between the other alternate pairs of ports of said first through fourth spaced passages and terminals of said groove, and also establishing communication between the other alternate pairs of ports of said fifth through tenth spaced passages, whereby during a first interval of time sample fluid enters via said first spaced passage and is vented directly via said fourth spaced passage; said carrier gas enters through said fifth spaced passage, passes out said tenth spaced passage and back into said third spaced passage, passes through said groove, driving before it a slug of sample fluid trapped therein, and out of said valve via said second spaced passage to said first column; said second chamber adapted to be vented during a second time interval, whereupon said power pistons revert to their first described position, during which sample gas enters via said first spaced passage and passes through said groove, and is vented via said fourth spaced passage; said carrier gas enters through said fifth spaced passages, passes out of said sixth spaced passage to said second sorption column; and said purge gas enters via said eighth spaced passage passes out said seventh spaced passage to back flush said first column, reenters said second spaced passage and exits from said third spaced passage passing into said tenth spaced passage and out of said ninth spaced passage to vent.

References Cited in the file of this patent
UNITED STATES PATENTS
3,085,440    Guenther _____ Apr. 16, 1963